United States Patent
Dong et al.

(10) Patent No.: US 8,325,481 B2
(45) Date of Patent: Dec. 4, 2012

(54) PORTABLE ELECTRONIC DEVICE WITH PENDANT ATTACHMENT SYSTEM

(75) Inventors: Min Dong, Shenzhen (CN); Kuan-Hung Chen, Shindian (TW); Yao Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 298 days.

(21) Appl. No.: 12/894,294

(22) Filed: Sep. 30, 2010

(65) Prior Publication Data

US 2012/0014044 A1 Jan. 19, 2012

(30) Foreign Application Priority Data

Jul. 16, 2010 (CN) .......................... 2010 1 0228987

(51) Int. Cl.
*G06F 1/16* (2006.01)
*H05K 5/00* (2006.01)
*H04M 1/00* (2006.01)
*G06F 3/033* (2006.01)

(52) U.S. Cl. ......... 361/679.55; 361/679.56; 361/679.01; 455/575.1; 455/575.3; 455/575.4; 345/179

(58) Field of Classification Search ........... 361/679.55–679.59, 679.01–679.45; 455/575.1–575.4; 345/168–180; 292/1, 292/137, 138, 145, DIG. 63
See application file for complete search history.

(56) References Cited

U.S. PATENT DOCUMENTS

| | | | |
|---|---|---|---|
| 4,758,855 A * | 7/1988 | Tamamura et al. | 396/536 |
| 6,392,639 B1 * | 5/2002 | Lee et al. | 345/179 |
| 7,333,326 B2 * | 2/2008 | Canova et al. | 361/679.55 |
| 7,508,383 B2 * | 3/2009 | Lev et al. | 345/179 |
| 7,715,192 B2 * | 5/2010 | Takahama | 361/679.59 |
| 8,014,133 B2 * | 9/2011 | Dong et al. | 361/679.01 |
| 8,194,055 B2 * | 6/2012 | Liu et al. | 345/179 |
| 2002/0044406 A1 * | 4/2002 | Shimoda et al. | 361/679 |
| 2005/0168500 A1 * | 8/2005 | Lee | 345/905 |
| 2010/0033911 A1 * | 2/2010 | Chang et al. | 361/679.01 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A portable electronic device includes a housing including a receptacle, a slot communicating with the receptacle and a protrusion located in the slot; a stylus releasably received in the receptacle, the stylus defining a notch and a passage communicating with the notch; and an attachment element wrapping on the protrusion and passing through the notch and the passage to extend outward from the portable electronic device.

13 Claims, 4 Drawing Sheets

PORTABLE ELECTRONIC DEVICE WITH PENDANT ATTACHMENT SYSTEM

The present application is related to co-pending U.S. patent application Ser. No. 10/148,475, entitled "PORTABLE ELECTRONIC DEVICE WITH PENDANT ATTACHMENT SYSTEM", by Dong et al. This application has the same assignee as the present application and has been concurrently filed herewith. The above-identified applications are incorporated herein by reference.

BACKGROUND

1. Technical Field

The exemplary disclosure generally relates to portable electronic devices, particularly to portable electronic devices with a pendant attachment system.

2. Description of Related Art

Mobile phone users often attach decorative pendants to their phones. The pendants generally hang from an attachment element, such as a string or chain looped through a dedicated hole or ligament of the mobile phone. However, it is difficult to thread the attachment element through the hole to attach the pendants as the hole is usually small.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary portable electronic device with a pendant attachment system. Moreover, in the drawings like reference numerals designate corresponding parts throughout the several views. Wherever possible, the same reference numbers are used throughout the drawings to refer to the same or like elements of an embodiment.

DETAILED DESCRIPTION

In this exemplary embodiment, the device is an electronic device such as a mobile telephone but any device to which a pendant can be attached is applicable. Accordingly, any reference herein to the mobile telephone should also be considered to apply equally to other portable electronic devices.

Figure 1:
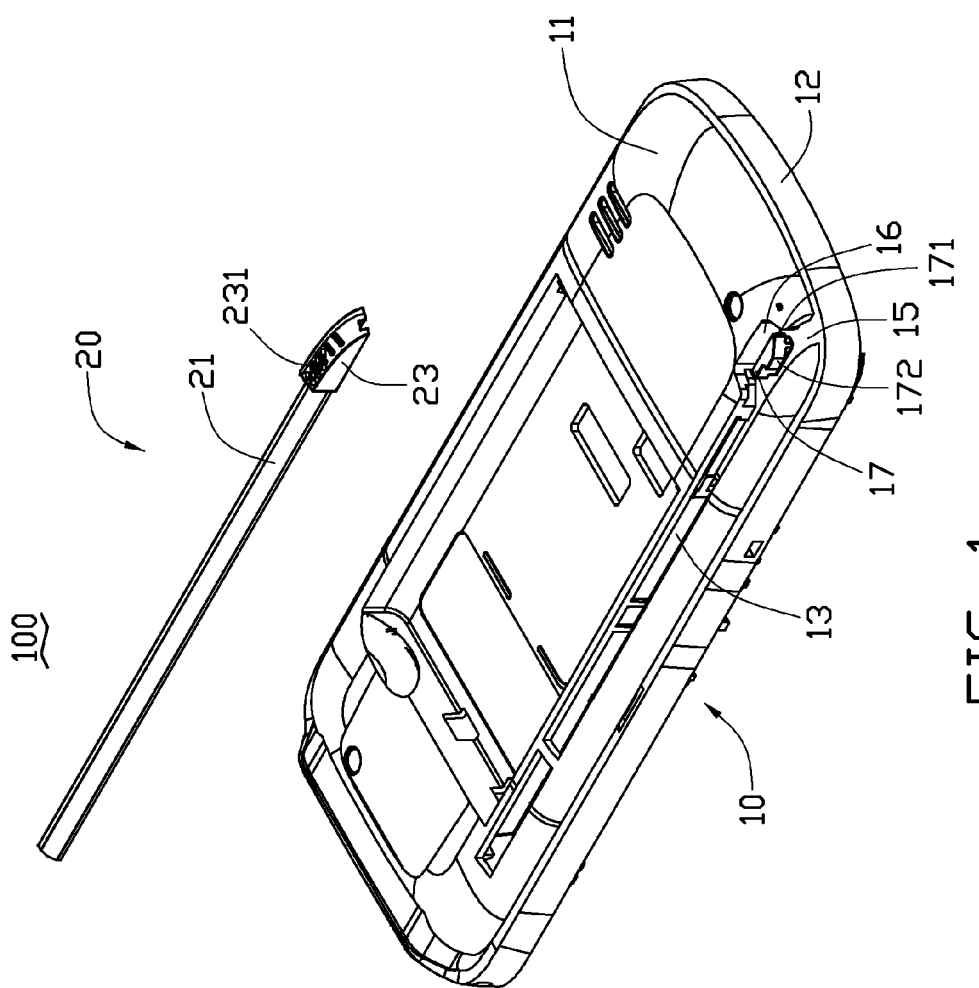
FIG. 1 is an exploded view of an exemplary embodiment of portable electronic device including a pendant attachment system provided by a housing and stylus.
Figure 3:
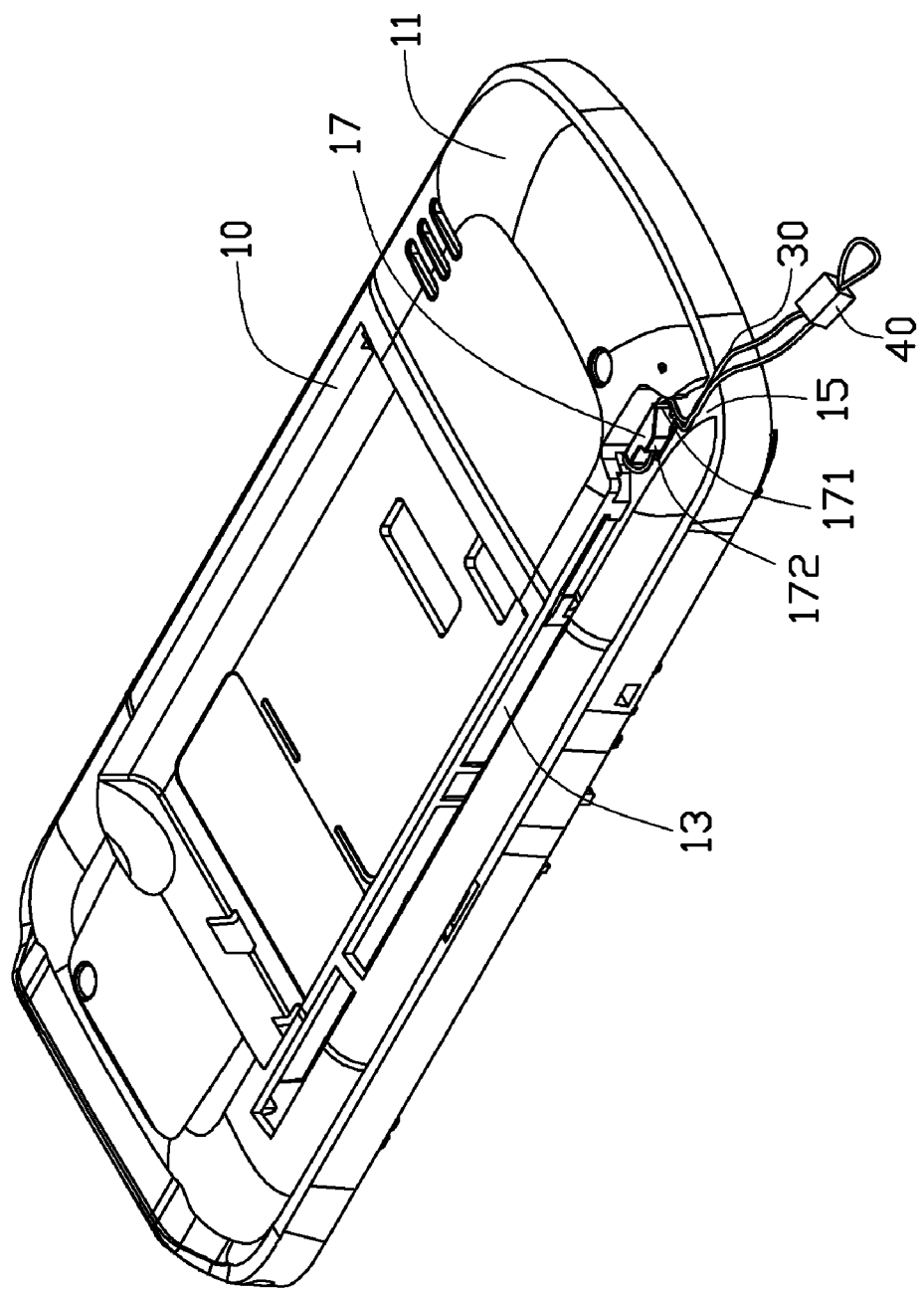
FIG. 3 is a schematic view of an attachment element fixed to the housing of FIG. 1.

Referring to FIGS. 1 and 3, the exemplary portable electronic device 100 includes a housing 10, a stylus 20 and an attachment element 30 of a pendant 40. The housing 10 includes a surface 11, an end portion 12 connecting to the surface 11, a receptacle 13, an opening 15, a slot 16 and a protrusion 17. The receptacle 13 is recessed in the surface 11 for accommodating the stylus 20. The opening 15 is defined in the end portion 12 and communicating with the receptacle 13. The stylus 20 is inserted in the receptacle 13 from the opening 15. The slot 16 is defined at one side of and communicates with the receptacle 13. The protrusion 17 is located in the slot 16, and the attachment element 30 wraps on the protrusion 17 when the attachment element 30 is located in the slot 16. The protrusion 17 includes two latching portions 171 respectively protruding from opposite sides thereof to maintain the attachment element 30 in the slot 16. The protrusion 17 further includes a hook 172 protruding toward the receptacle 13 to retain the stylus 20 in the receptacle 13.

Figure 2:
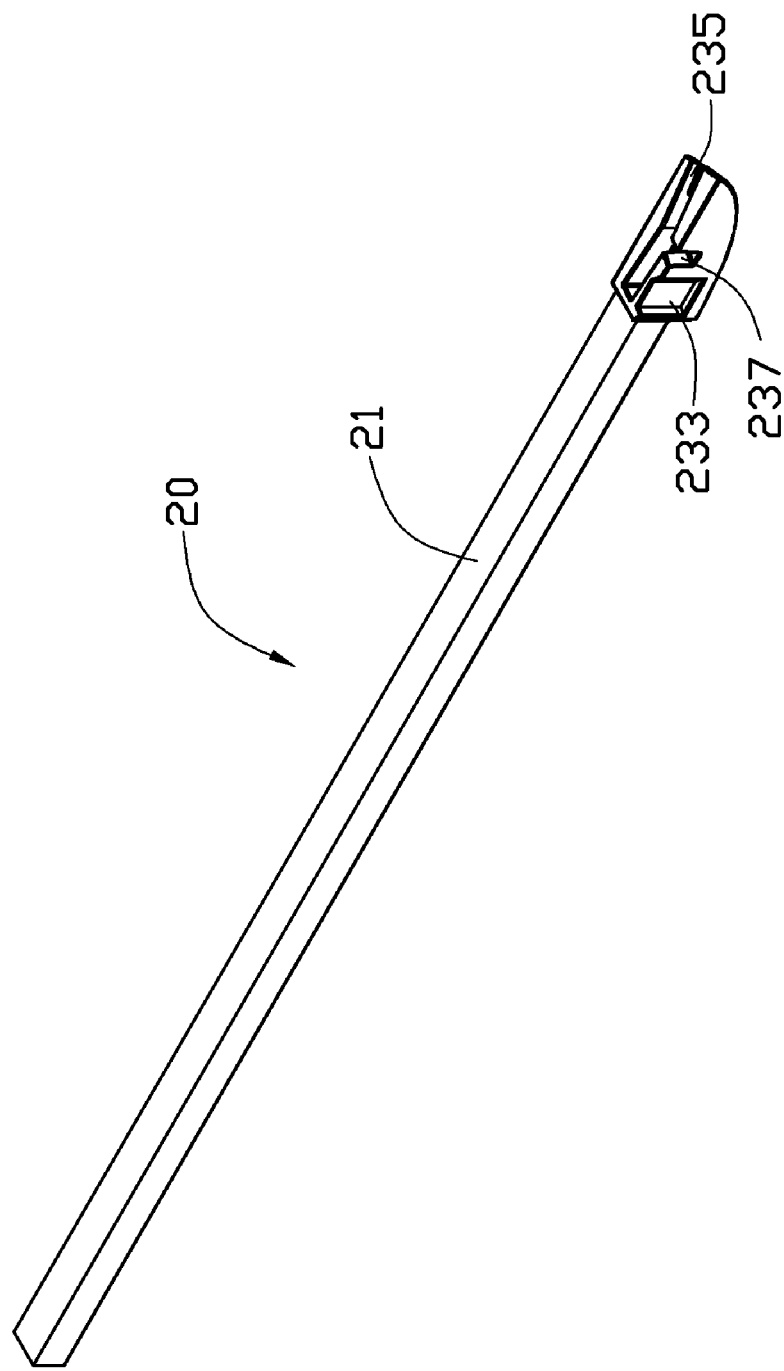
FIG. 2 is an enlarged view of the stylus in FIG. 1 from another aspect.

Referring to FIGS. 1 and 2, the stylus 20 includes a stylus body 21 and a stylus head 23 protruding from the stylus body 21. The stylus 20 further includes at least one rib 231 protruding from the stylus head 23 facilitating removal the stylus 20 from the receptacle 13, and a latching groove 233 defined in a side of the stylus head 23 facing the protrusion 17 receiving the hook 172 so the stylus 20 is retained in the receptacle 13. The stylus 20 may further include a passage 235 defined in a side of the stylus head 23 facing the housing 10 and extending to a distal end of the stylus head 23. The stylus 20 further includes a notch 237 defined in a side of the stylus head 23 facing the protrusion 17. The notch 237 communicates with the passage 235, and the combination of the notch 237 and the passage 235 allow the attachment element 30 to pass through the stylus 20 and from the electronic device 100.

Figure 4:
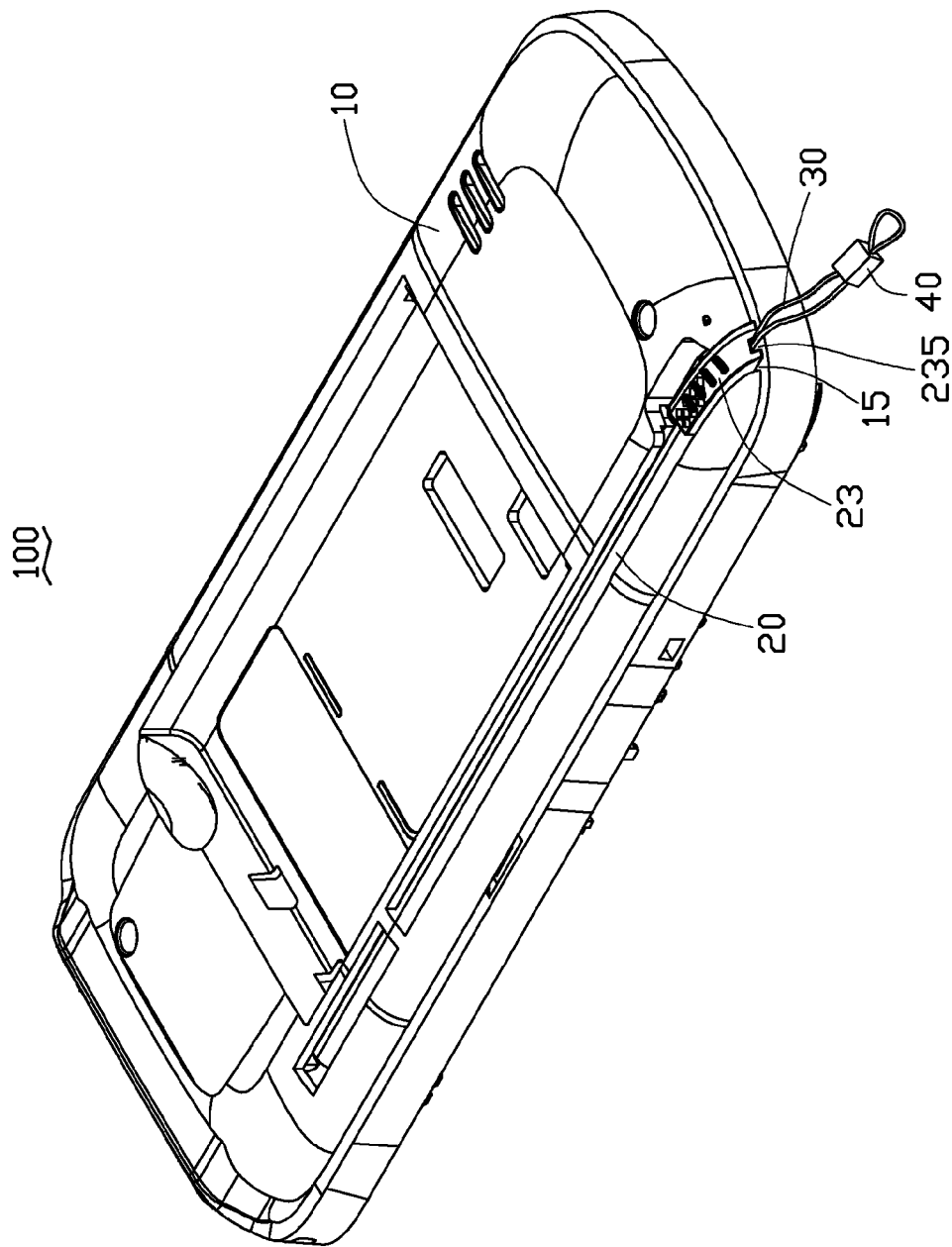
FIG. 4 is a schematic view of the stylus in FIG. 1 received in the housing of FIG. 3.

Referring to FIGS. 3 and 4, in use, the attachment element 30 is partially positioned in the slot 16 and wraps around the protrusion 17, the rest of the attachment element 30 extends outward from the housing 10 from the receptacle 13 and the opening 15. The stylus 20 is then received in the receptacle 13 from the opening 15 until the hook 172 is received in the latching groove 233. At this time, the portion of the attachment element 30 located in the receptacle 13 and the opening 15 is accommodated in the notch 237 and the passage 235 to prevent the attachment element 30 from exiting the slot 16 so the attachment element 30 is firmly located in the slot 16 by the combination of the stylus 20 and the latching portions 171. In other words, the attachment element 30 may pass through the notch 237, the passage 235 to extend outward from the portable electronic device 100. To remove the attachment element 30 from the device 100, the stylus 20 is withdrawn from the receptacle 13 with the hook 172 releasing from the latching groove 233, such as by removal of the rib 231. With this motion, the attachment element 30 can be easily removed from the slot 16.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising: a housing including a receptacle and a protrusion protruding therefrom; a stylus releasably receivable in the receptacle, the stylus defining a notch and a passage communicating with the notch; and an attachment element partially located in the receptacle and wrapping around the protrusion and passing through the notch and the passage to extend outward from the portable electronic device; wherein the stylus includes a stylus body and a stylus head protruding from the stylus body; the passage defined in a side of the stylus head facing the housing and extending to a distal end of the stylus head; the notch defined in a side of the stylus head facing the protrusion.

2. The portable electronic device as claimed in claim 1, wherein the stylus further includes at least one rib protruding from the stylus head facilitating removal of the stylus from the receptacle.

3. The portable electronic device as claimed in claim 1, wherein the protrusion comprises a hook protruding toward the receptacle; the stylus further defining a latching groove in a side of the stylus head facing the protrusion receiving the hook so the stylus is retained in the receptacle.

4. The portable electronic device as claimed in claim 1, wherein the protrusion includes two latching portions respectively protruding from opposite sides thereof to prevent the attachment element from exiting the slot.

5. A portable electronic device, comprising: a housing including a receptacle, an opening communicating with the receptacle and a protrusion located near the receptacle; an attachment element wrapping on the protrusion to retain the attachment element to the housing, and the attachment element passing through the receptacle and the opening to extend outward from the housing; and a stylus removably accommodated in the receptacle; wherein the stylus defines a notch and a passage communicating with the notch; a portion of the attachment element located in the receptacle and the opening accommodated in the notch and the passage; and wherein the stylus includes a stylus body and a stylus head protruding from the stylus body; the passage defined in a side of the stylus head facing the housing and extending to a distal end of the stylus head; the notch defined in a side of the stylus head facing the protrusion.

6. The portable electronic device as claimed in claim 5, wherein the stylus further includes at least one rib protruding from the stylus head facilitating removal of the stylus from the receptacle.

7. The portable electronic device as claimed in claim 5, wherein the protrusion has a hook protruding toward the receptacle; the stylus further defines a latching groove in a side of the stylus head facing the protrusion receiving the hook so the stylus is retained in the receptacle.

8. The portable electronic device as claimed in claim 5, wherein the housing further defines a slot communicating with the receptacle, the protrusion is located in the slot.

9. The portable electronic device as claimed in claim 8, wherein the protrusion includes two latching portions respectively protruding from opposite sides thereof for prevent the attachment element from exiting the slot.

10. A portable electronic device, comprising: a stylus; a housing including a receptacle for accommodating the stylus, an opening communicating with the receptacle, a slot communicating with the receptacle and a protrusion located in the slot; and an attachment element partially positioned in the slot and wrapping on the protrusion, the rest of the attachment element passing through the receptacle and the opening to extend outward from the housing; wherein the stylus defines a notch and a passage communicating with the notch; a portion of the attachment element located in the receptacle and the opening accommodated in the notch and the passage; and wherein the stylus includes a stylus body and a stylus head protruding from the stylus body; the passage defined in a side of the stylus head facing the housing and extending to a distal end of the stylus head; the notch defined in a side of the stylus head facing the protrusion.

11. The portable electronic device as claimed in claim 10, wherein the stylus further includes at least one rib protruding from the stylus head facilitating removal of the stylus from the receptacle.

12. The portable electronic device as claimed in claim 10, wherein the protrusion comprises a hook protruding toward the receptacle; the stylus further defines a latching groove in a side of the stylus head facing the protrusion receiving the hook so the stylus is retained in the receptacle.

13. The portable electronic device as claimed in claim 10, wherein the protrusion includes two latching portions respectively protruding from opposite sides thereof to prevent the attachment element from exiting the slot.

* * * * *